(12) United States Patent
Hahn et al.

(10) Patent No.: US 12,349,106 B2
(45) Date of Patent: Jul. 1, 2025

(54) METHOD AND DEVICE FOR PAGING IN SIDELINK COMMUNICATION

(71) Applicants: HYUNDAI MOTOR COMPANY, Seoul (KR); KIA CORPORATION, Seoul (KR); WONKWANG UNIVERSITY CENTER FOR INDUSTRY-ACADEMY COOPERATION, Iksan-si (KR)

(72) Inventors: Gene Back Hahn, Hwaseong-si (KR); Hyuk Min Son, Iksan-si (KR)

(73) Assignees: Hyundai Motor Company, Seoul (KR); WONKWANG UNIVERSITY CENTER FOR INDUSTRY-ACADEMY COOPERATION, Seoul (KR); Kia Corporation, Iksan-si (KR)

( * ) Notice: Subject to any disclaimer, the term of this patent is extended or adjusted under 35 U.S.C. 154(b) by 346 days.

(21) Appl. No.: 17/920,159

(22) PCT Filed: May 4, 2021

(86) PCT No.: PCT/KR2021/005606
§ 371 (c)(1),
(2) Date: Oct. 20, 2022

(87) PCT Pub. No.: WO2021/225356
PCT Pub. Date: Nov. 11, 2021

(65) Prior Publication Data
US 2023/0180179 A1 Jun. 8, 2023

Related U.S. Application Data

(60) Provisional application No. 63/021,258, filed on May 7, 2020.

(30) Foreign Application Priority Data

May 3, 2021 (KR) ........................ 10-2021-0057514

(51) Int. Cl.
*H04W 68/00* (2009.01)
*H04W 4/70* (2018.01)
(Continued)

(52) U.S. Cl.
CPC ......... *H04W 68/02* (2013.01); *H04W 68/005* (2013.01); *H04W 92/18* (2013.01)

(58) Field of Classification Search
CPC .... H04W 68/02; H04W 68/005; H04W 92/18
(Continued)

(56) References Cited

U.S. PATENT DOCUMENTS 10,326,517 B2 6/2019 Seo et al.
2016/0100442 A1 4/2016 Xu et al.
(Continued)

FOREIGN PATENT DOCUMENTS

WO 2016/032201 A2 3/2016
WO 2018/064477 A1 4/2018
(Continued)

OTHER PUBLICATIONS

International Search Report dated Aug. 26, 2021 issued in International Patent Application No. PCT/KR2021/005606 (with English translation).
(Continued)

*Primary Examiner* — Mark G. Pannell
(74) *Attorney, Agent, or Firm* — Morgan Lewis & Bockius LLP

(57) ABSTRACT

A method and a device for paging in sidelink communication are disclosed. An operating method of a transmitting terminal comprises the steps of: receiving SL paging setup
(Continued)

information from a base station; receiving a paging DCI from the base station in an SPO indicated by the SL paging setup information; and transmitting an SL paging message to one or more receiving terminals in a sidelink resource indicated by the paging DCI.

20 Claims, 12 Drawing Sheets

(51) Int. Cl.
  *H04W 68/02* (2009.01)
  *H04W 92/18* (2009.01)
(58) Field of Classification Search
  USPC .......................................................... 455/458
  See application file for complete search history.

(56) References Cited

U.S. PATENT DOCUMENTS

| | | | | |
|---|---|---|---|---|
| 2019/0261309 A1* | 8/2019 | Martin | ................... | H04W 76/14 |
| 2019/0364492 A1* | 11/2019 | Azizi | ..................... | H04W 4/024 |
| 2019/0373578 A1* | 12/2019 | Hong | .................... | H04W 76/28 |
| 2020/0029299 A1* | 1/2020 | Kuang | .................... | H04W 4/06 |
| 2020/0314940 A1* | 10/2020 | Park | ......................... | H04W 4/40 |
| 2021/0127414 A1* | 4/2021 | Abdoli | .................. | H04L 5/0055 |
| 2021/0250902 A1* | 8/2021 | Lee | ......................... | H04W 68/02 |
| 2021/0258916 A1* | 8/2021 | He | ......................... | H04W 68/005 |
| 2022/0061021 A1* | 2/2022 | Wang | .................... | H04L 1/0061 |
| 2022/0132464 A1* | 4/2022 | Agiwal | ................. | H04W 24/08 |
| 2022/0174762 A1* | 6/2022 | Pan | ......................... | H04W 12/06 |
| 2022/0346012 A1* | 10/2022 | Fei | ..................... | H04W 52/0229 |
| 2023/0014303 A1* | 1/2023 | Di Girolamo | ......... | H04W 72/20 |
| 2024/0007996 A1* | 1/2024 | Wang | .................. | H04W 68/005 |
| 2024/0188107 A1* | 6/2024 | Elkotby | ................ | H04W 28/26 |

FOREIGN PATENT DOCUMENTS

| | | |
|---|---|---|
| WO | 2018/137284 A1 | 8/2018 |
| WO | 2018/208114 A1 | 11/2018 |
| WO | 2021/013337 A1 | 1/2021 |

OTHER PUBLICATIONS

Huawei, et al., "Further discussion on the paging receiving via Relay UE." R2-1703470, 3GPP TSG-RAN WG2 Meeting #97bis, Apr. 2017, pp. 1-6 and Figures 1-5(b).

"New WID on NR Sidelink Enhancement," 3GPP TSG-RAN Meeting #86, Dec. 9-12, 2019.

* cited by examiner

[FIG. 1]
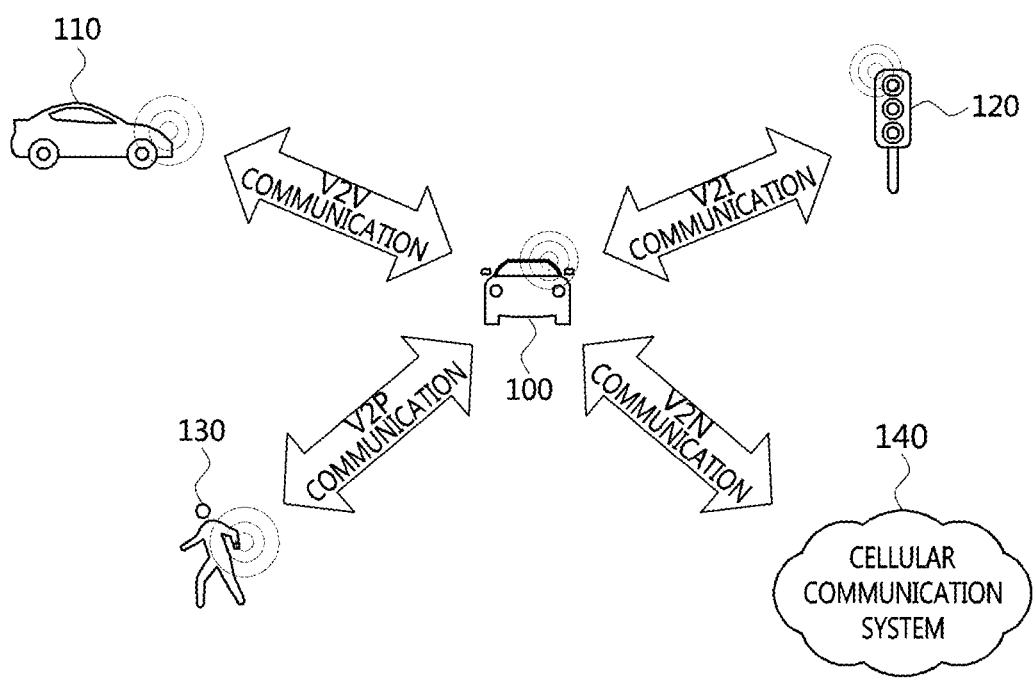

[FIG. 2]
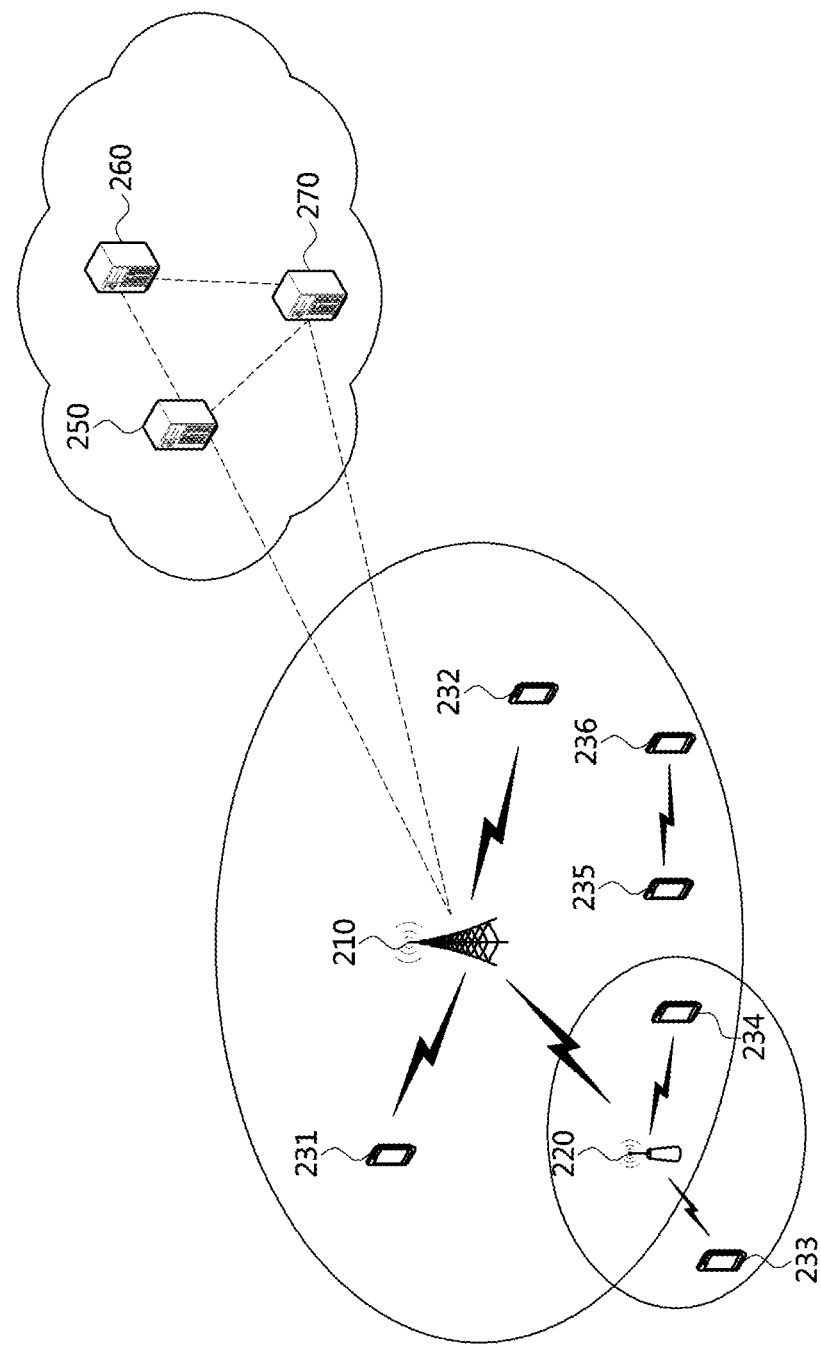

[FIG. 3]
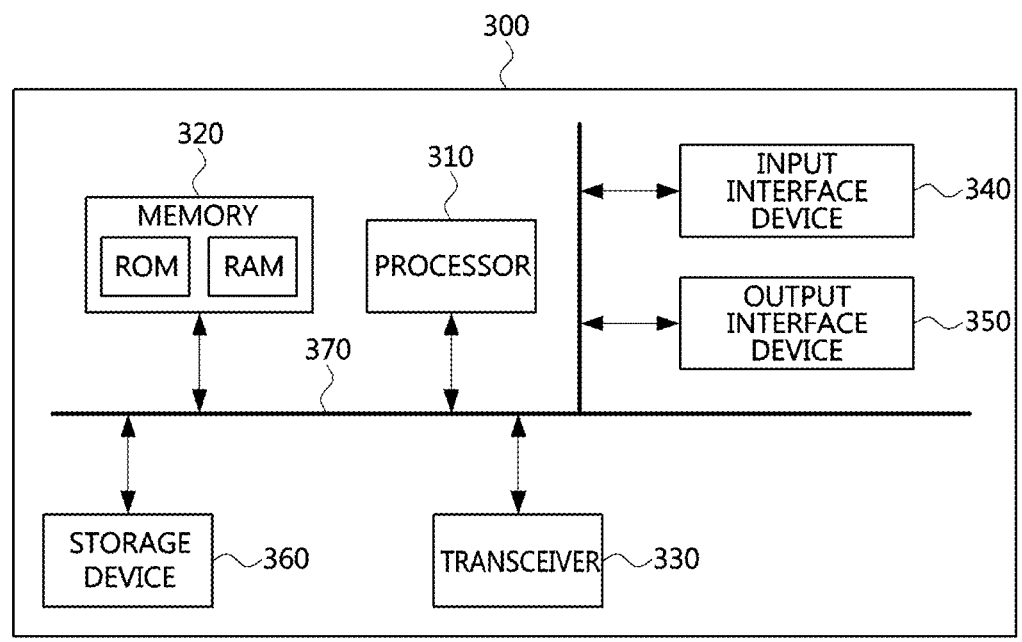
[FIG. 4]
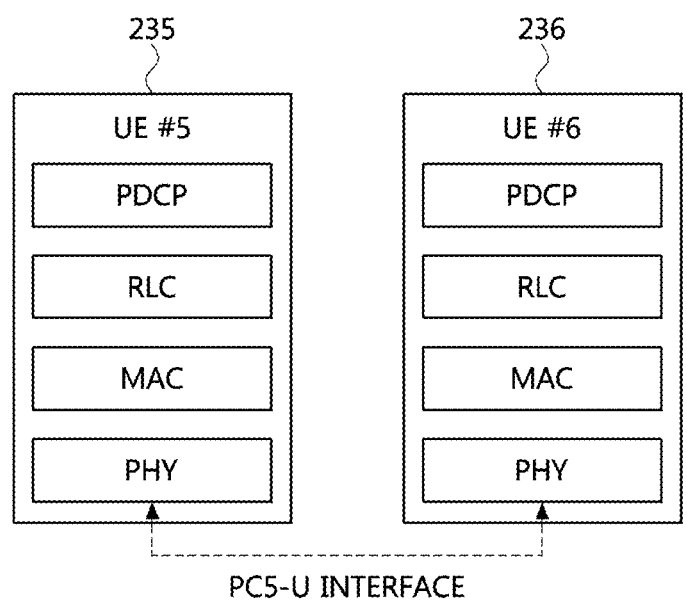

[FIG. 5]
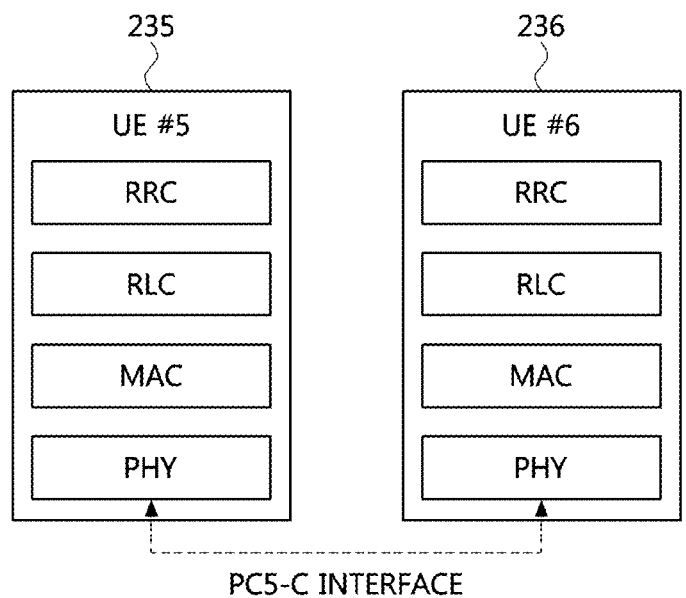
[FIG. 6]
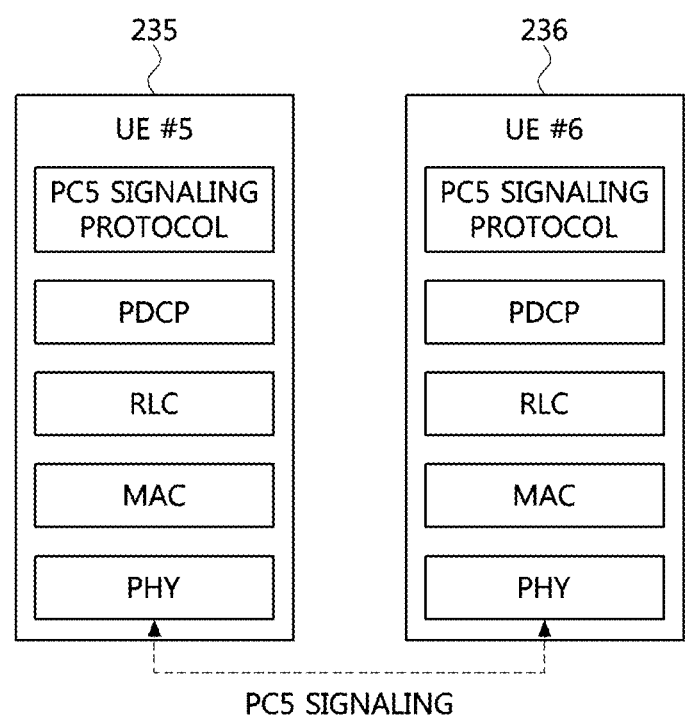

[FIG. 7]
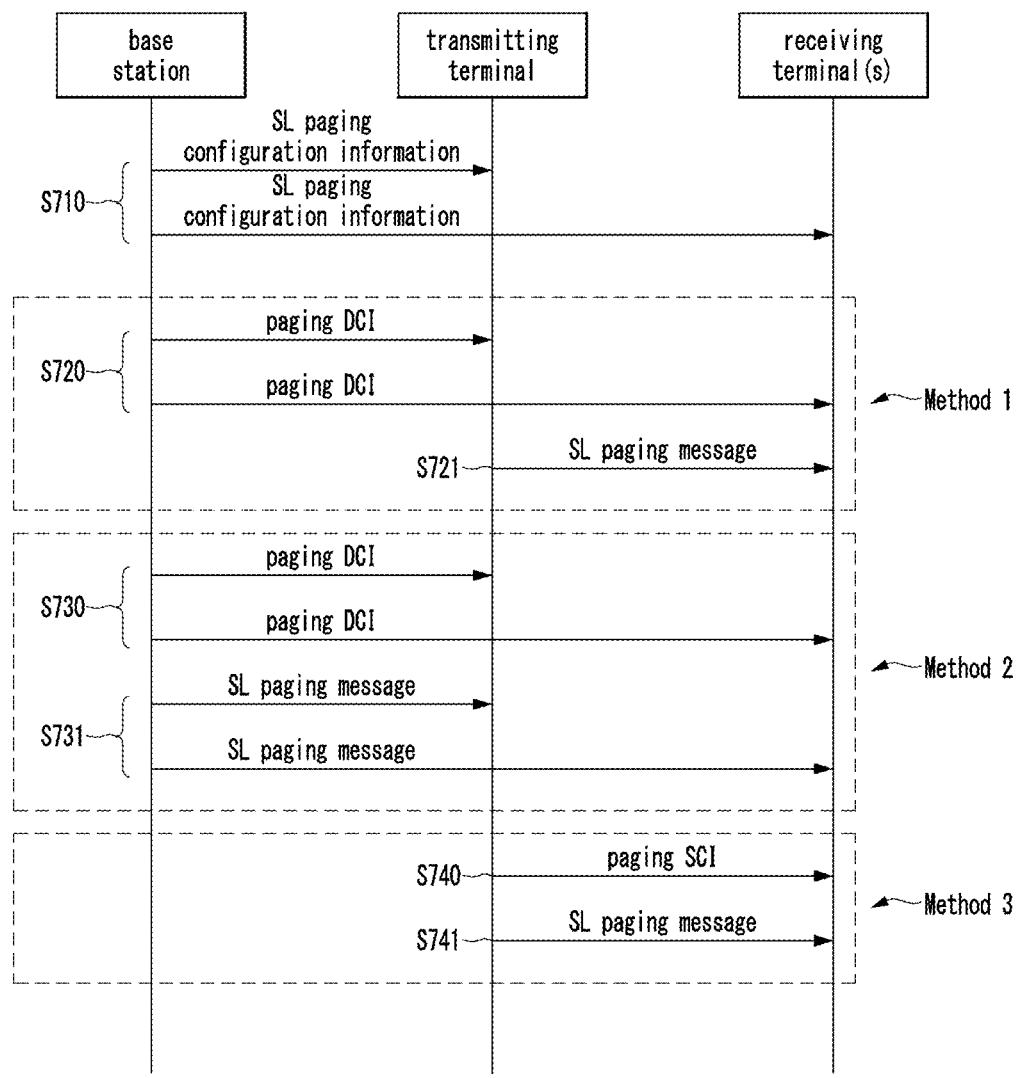

[FIG. 8]
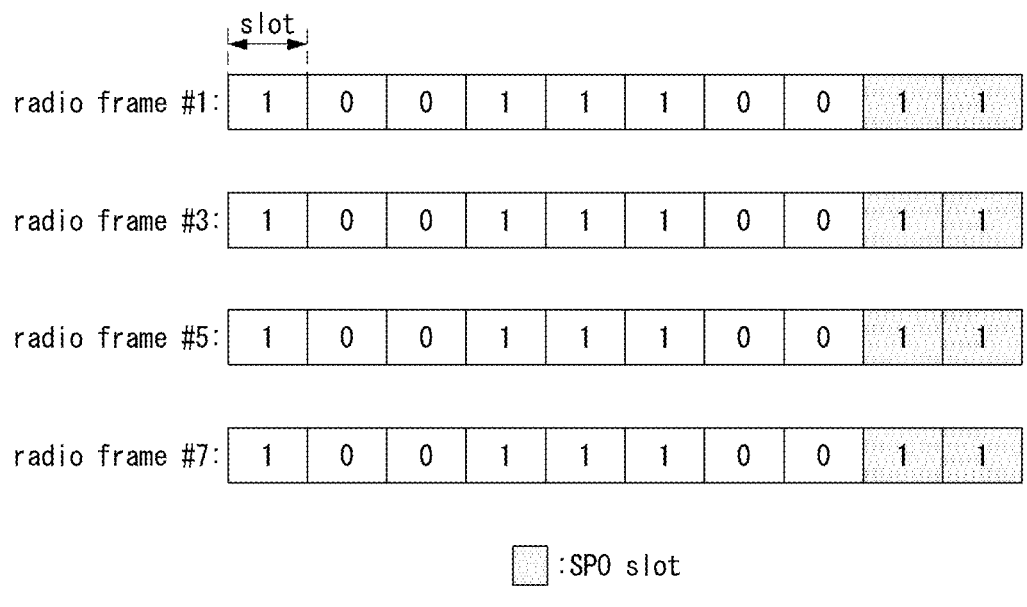
[FIG. 9]
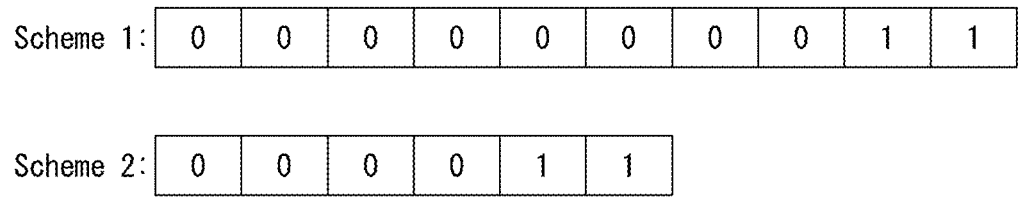

[FIG. 10]
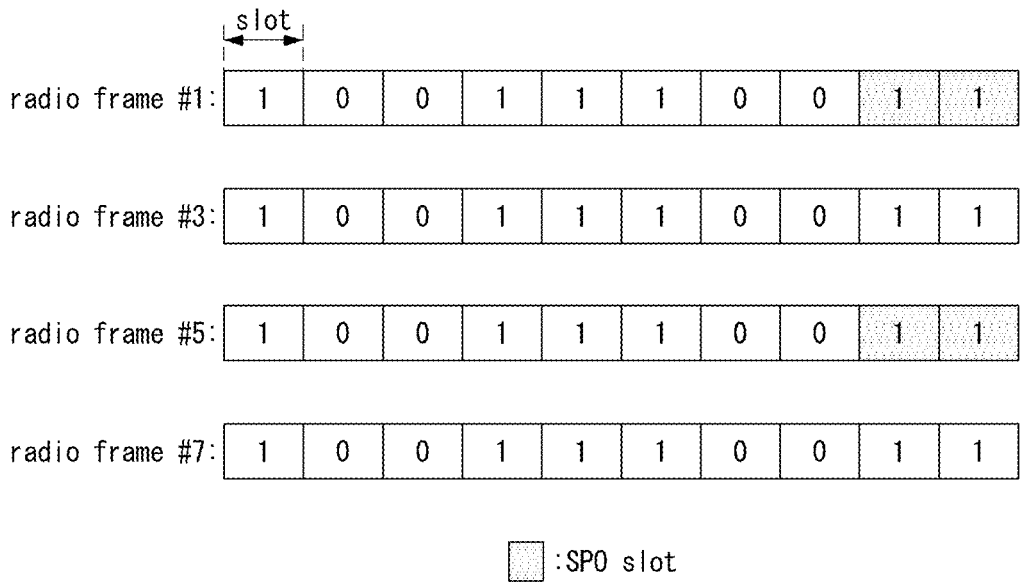
[FIG. 11]
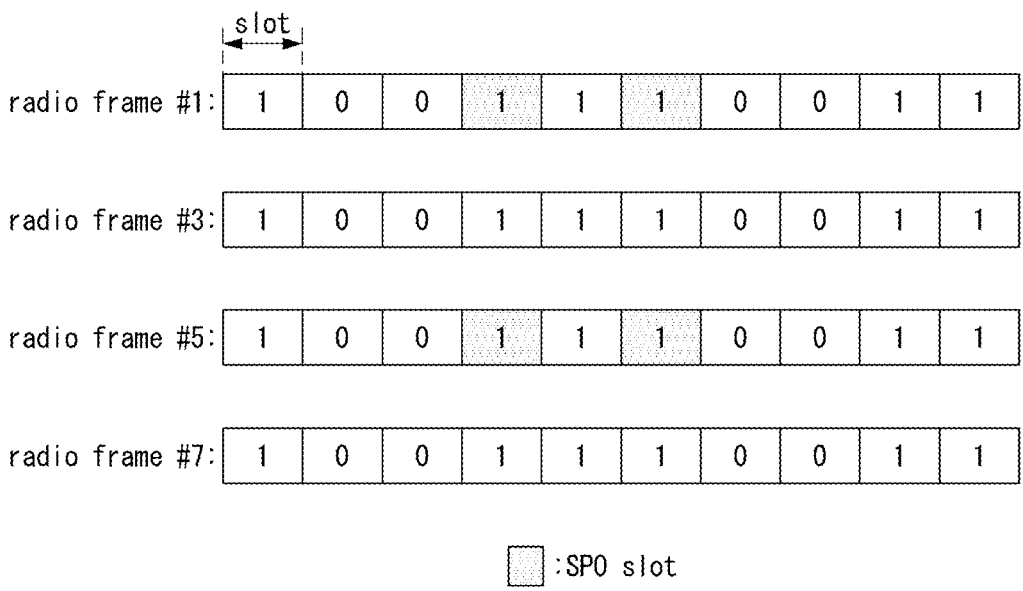

[FIG. 12]
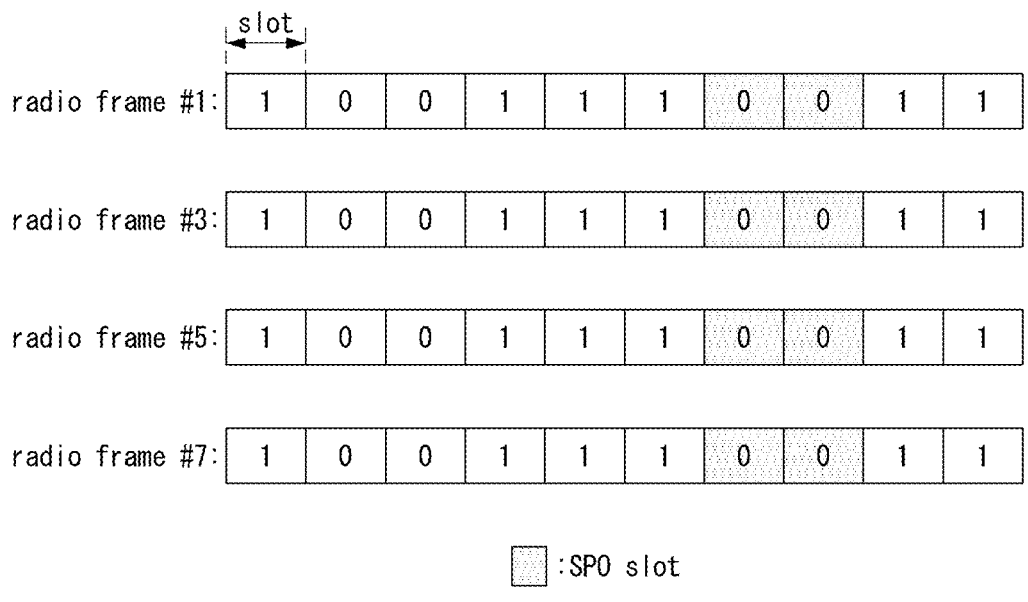
[FIG. 13]
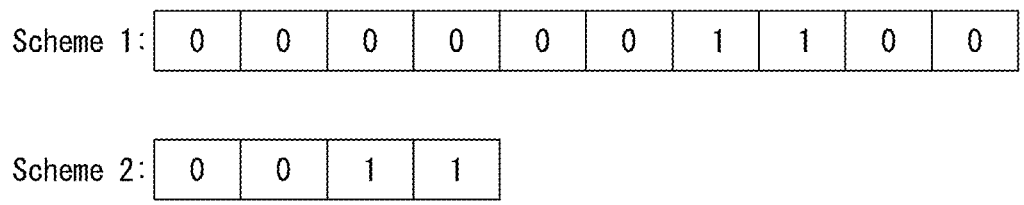

[FIG. 14]
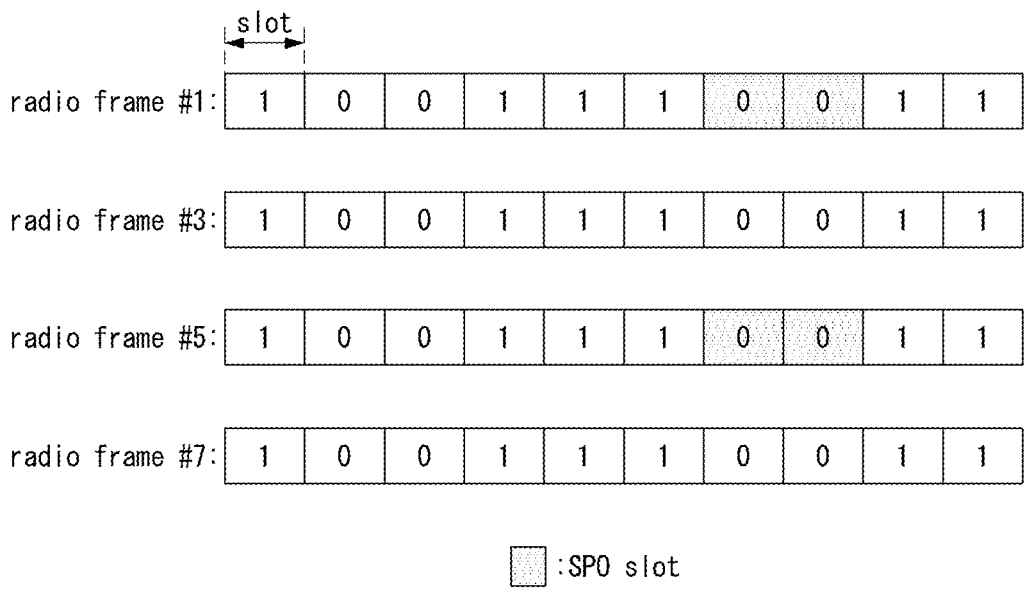
[FIG. 15]
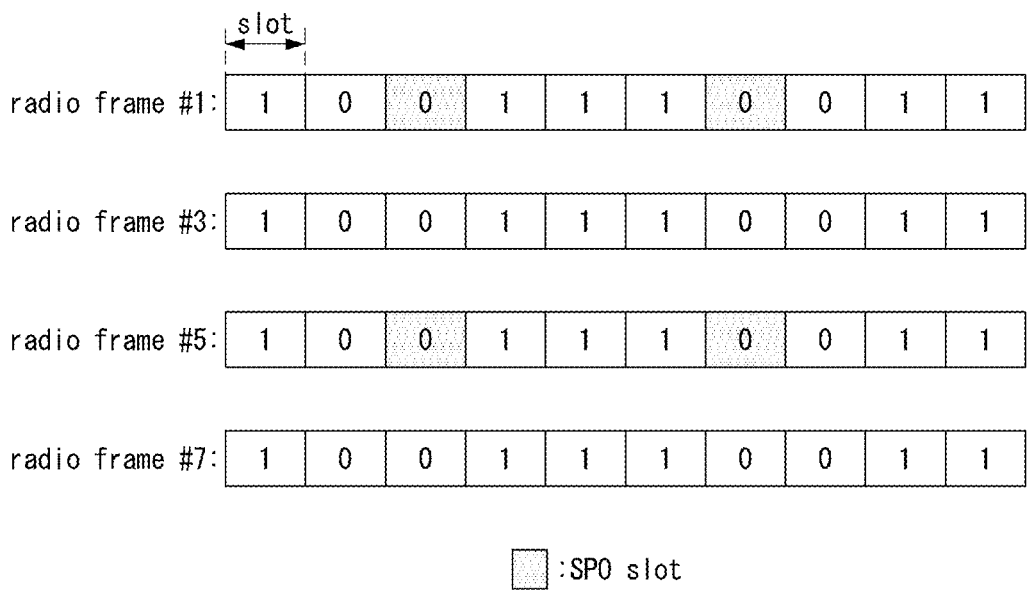

[FIG. 16]
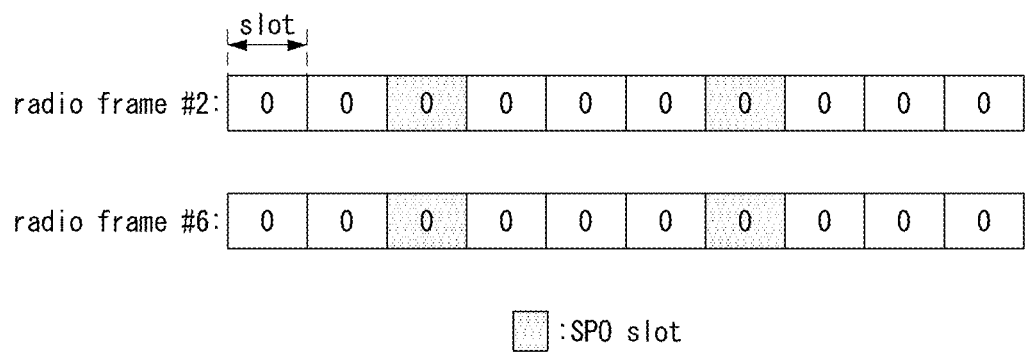
[FIG. 17]
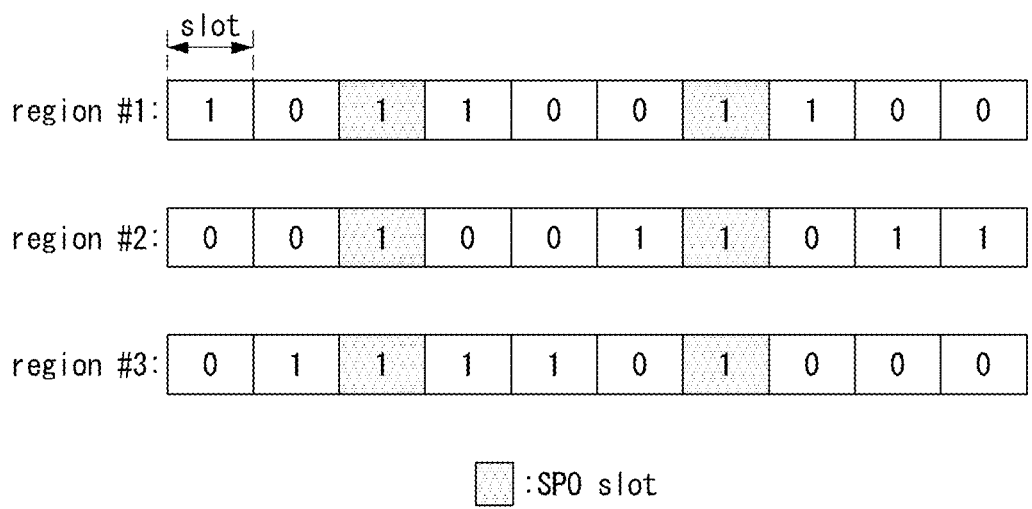

[FIG. 18]
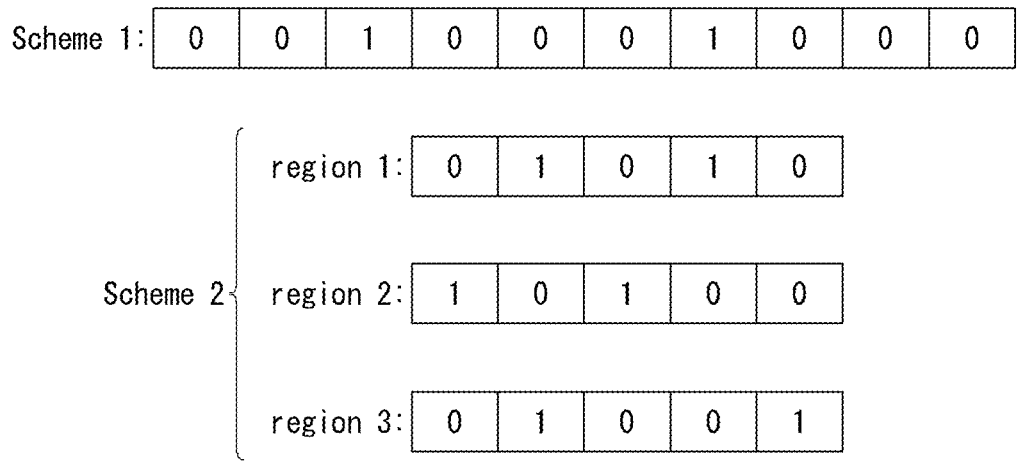
[FIG. 19]
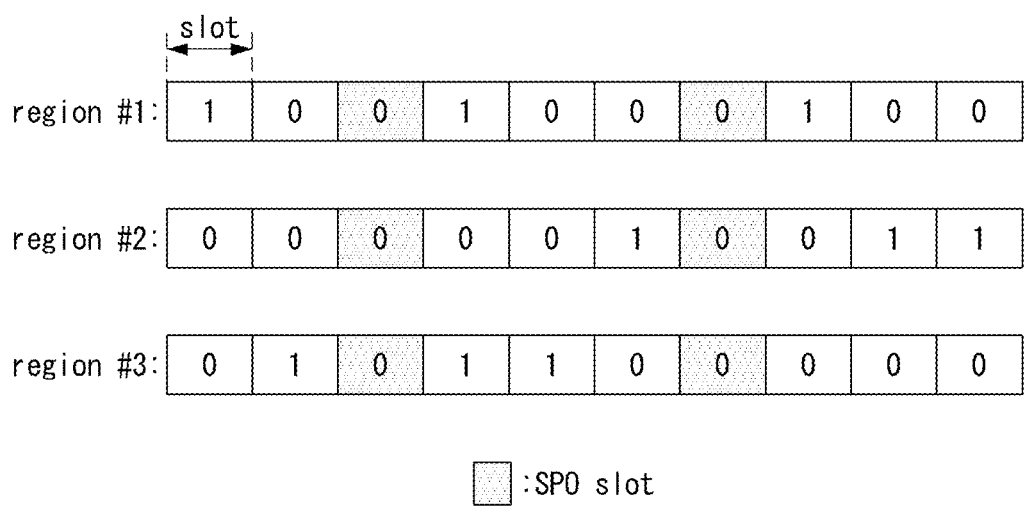

[FIG. 20]
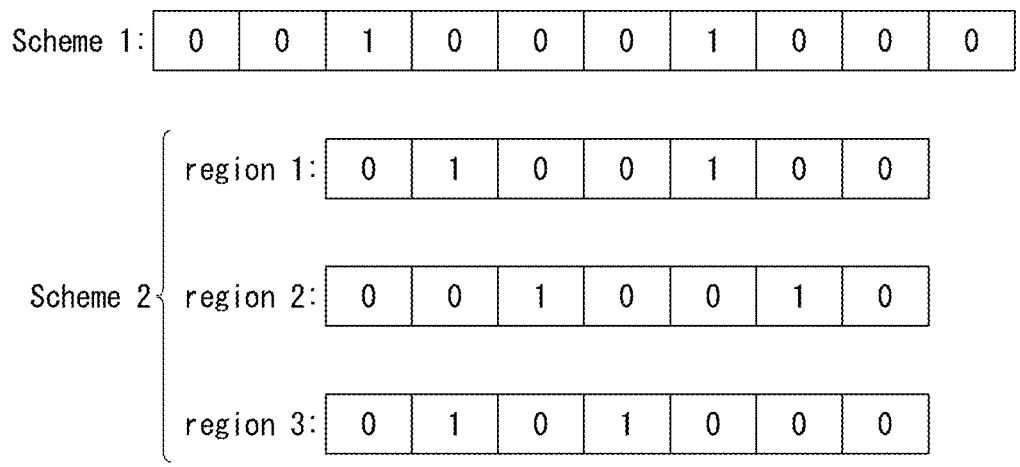

METHOD AND DEVICE FOR PAGING IN SIDELINK COMMUNICATION

CROSS-REFERENCE OF RELATED APPLICATIONS

This application is the U.S. National Phase under 35 U.S.C. § 371 of International Patent Application No. PCT/KR2021/005606, filed on May 4, 2021, which in turn claims the benefit of U.S. Provisional Patent Application No. 63/021,258, filed on May 7, 2020 and Korean Patent Application No. 10-2021-0057514, filed on May 3, 2021, the entire disclosures of which applications are incorporated by reference herein.

TECHNICAL FIELD

The present disclosure relates to a sidelink communication technique, and more particularly, to a paging technique for sidelink communication.

BACKGROUND ART

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, in sidelink communication, a terminal may support discontinuous reception (DRX) operations. In this case, there is a need for methods of paging terminal(s) operating in an idle state or an inactive state.

DISCLOSURE

Technical Problem

An objective of the present disclosure for solving the above-described problem is to provide a method and an apparatus for paging in sidelink communication.

Technical Solution

An operation method of a transmitting terminal, according to a first exemplary embodiment of the present disclosure for achieving the objective, may comprise: receiving, from a base station, sidelink (SL) paging configuration information; receiving, from the base station, paging downlink control information (DCI) in a sidelink paging occasion (SPO) indicated by the SL paging configuration information; and transmitting an SL paging message to one or more receiving terminals in a sidelink resource indicated by the paging DCI.

The SL paging configuration information may further include a sidelink-paging-radio network temporary identifier (SL-P-RNTI), and the paging DCI may be received using the SL-P-RNTI.

The SL-P-RNTI may be configured for each cast type, and the cast type may be unicast, groupcast, or broadcast.

The paging DCI may further include an identifier (ID) indicating a cast type of the SL paging message, and the ID may be an ID of the transmitting terminal, a group ID, or a broadcast ID.

The operation method may further comprise, when the transmission of the SL paging message is completed, performing sidelink communication with the one or more receiving terminals according to a cast type associated with the SL paging message, wherein the cast type may be unicast, groupcast, or broadcast.

An operation method of a transmitting terminal, according to a second exemplary embodiment of the present disclosure for achieving the objective, may comprise: receiving, from a base station, sidelink (SL) paging configuration information; transmitting, to one or more receiving terminals, paging sidelink control information (SCI) in a sidelink paging occasion (SPO) indicated by the SL paging configuration information; and transmitting, to the one or more receiving terminals, an SL paging message in a sidelink resource indicated by the paging SCI.

The SPO may be configured within a resource pool configured by the base station, and a first bitmap indicating one or more slots in which the SPO is configured within the resource pool may be included in the SL paging configuration information.

A second bitmap indicating one or more slots in which the resource pool is configured may be received from the base station, and the SPO may be indicated by a combination of the first bitmap and the second bitmap.

A number of bits included in the first bitmap may be equal to a number of slots configured as the resource pool within a preconfigured period.

A number of bits included in the first bitmap may be equal to a number of all slots belonging to a period according to a configuration unit of the resource pool.

The SPO may be configured outside a resource pool configured by the base station, and a first bitmap indicating one or more slots in which the SPO is configured outside the resource pool may be included in the SL paging configuration information.

The SL paging configuration information may further include a sidelink-paging-radio network temporary identifier (SL-P-RNTI), and the paging SCI may be received using the SL-P-RNTI.

The SL-P-RNTI may be configured for each cast type, and the cast type may be unicast, groupcast, or broadcast.

The paging SCI may further include an identifier (ID) indicating a cast type of the SL paging message, and the ID may be an ID of the transmitting terminal, a group ID, or a broadcast ID.

The operation method may further comprise, when the transmission of the SL paging message is completed, performing sidelink communication with the one or more receiving terminals according to a cast type associated with the SL paging message, wherein the cast type may be a unicast, a groupcast, or a broadcast.

An operation method of a receiving terminal, according to a third exemplary embodiment of the present disclosure for achieving the objective, may comprise: receiving, from a base station, sidelink (SL) paging configuration information; receiving, from a transmitting terminal, paging sidelink control information (SCI) by performing a monitoring operation on a sidelink paging occasion (SPO) indicated by the SL paging configuration information; and receiving, from the transmitting terminal, an SL paging message in a sidelink resource indicated by the paging SCI.

The paging SCI and the SL paging message associated with the paging SCI may be received in a same SPO.

The SPO may be configured within a resource pool configured by the base station, and a first bitmap indicating one or more slots in which the SPO is configured within the resource pool may be included in the SL paging configuration information.

The SL paging configuration information may further include a sidelink-paging-radio network temporary identifier (SL-P-RNTI), and the paging SCI may be received using the SL-P-RNTI.

The paging SCI may further include an identifier (ID) indicating a cast type of the SL paging message, and the ID may be an ID of the transmitting terminal, a group ID, or a broadcast ID.

Advantageous Effects

According to the present disclosure, a sidelink paging occasion (SPO) may be configured, and configuration information of the SPO may be transmitted to terminal(s). A transmitting terminal may transmit a sidelink (SL) paging message to a receiving terminal by using the SPO, and the receiving terminal may receive the SL paging message from the transmitting terminal by performing a monitoring operation on the SPO. Accordingly, paging operations can be efficiently performed in sidelink communication, and the performance of the communication system can be improved.

DESCRIPTION OF DRAWINGS

FIG. 1 is a conceptual diagram illustrating V2X communication scenarios.

FIG. 2 is a conceptual diagram illustrating an exemplary embodiment of a cellular communication system.

FIG. 3 is a conceptual diagram illustrating an exemplary embodiment of a communication node constituting a cellular communication system.

FIG. 4 is a block diagram illustrating an exemplary embodiment of a user plane protocol stack of a UE performing sidelink communication.

FIG. 5 is a block diagram illustrating a first exemplary embodiment of a control plane protocol stack of a UE performing sidelink communication.

FIG. 6 is a block diagram illustrating a second exemplary embodiment of a control plane protocol stack of a UE performing sidelink communication.

FIG. 7 is a sequence chart illustrating a first exemplary embodiment of a paging method for sidelink communication.

FIG. 8 is a conceptual diagram illustrating a first exemplary embodiment of an SPO configuration method in a communication system.

FIG. 9 is a conceptual diagram illustrating a first exemplary embodiment of an SPO indication method in a communication system.

FIG. 10 is a conceptual diagram illustrating a second exemplary embodiment of an SPO configuration method in a communication system.

FIG. 11 is a conceptual diagram illustrating a third exemplary embodiment of an SPO configuration method in a communication system.

FIG. 12 is a conceptual diagram illustrating a fourth exemplary embodiment of an SPO configuration method in a communication system.

FIG. 13 is a conceptual diagram illustrating a second exemplary embodiment of an SPO indication method in a communication system.

FIG. 14 is a conceptual diagram illustrating a fifth exemplary embodiment of an SPO configuration method in a communication system.

FIG. 15 is a conceptual diagram illustrating a sixth exemplary embodiment of an SPO configuration method in a communication system.

FIG. 16 is a conceptual diagram illustrating a seventh exemplary embodiment of an SPO configuration method in a communication system.

FIG. 17 is a conceptual diagram illustrating an eighth exemplary embodiment of an SPO configuration method in a communication system.

FIG. 18 is a conceptual diagram illustrating a third exemplary embodiment of an SPO indication method in a communication system.

FIG. 19 is a conceptual diagram illustrating a ninth exemplary embodiment of an SPO configuration method in a communication system.

FIG. 20 is a conceptual diagram illustrating a fourth exemplary embodiment of an SPO indication method in a communication system.

MODES OF THE INVENTION

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another.

For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present invention will be described in detail with reference to the accompanying drawings. In describing the present invention, to facilitate the entire understanding, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

FIG. 2 is a conceptual diagram illustrating an exemplary embodiment of a cellular communication system.

As shown in FIG. 2, a cellular communication system may include an access network, a core network, and the like.

The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Then, retransmission methods of sidelink data will be described. In exemplary embodiments, a HARQ response may be referred to as HARQ-acknowledgement (ACK). The HARQ response may be ACK or negative ACK (NACK). A downlink (DL) HARQ response may be a HARQ response to downlink data, an uplink (UL) HARQ response may be a HARQ response to uplink data, and a sidelink (SL) HARQ response may be a HARQ response to sidelink data.

Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A first-stage SCI format may include an SCI format 1-A, and a second-stage SCI format may include an SCI format 2-A, an SCI format 2-B, and an SCI format 2-C.

The 1st-stage SCI may include or more information elements among priority information, frequency resource assignment information, time resource assignment information, resource reservation period information, demodulation reference signal (DMRS) pattern information, 2nd-stage SCI format information, a beta_offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements.

Meanwhile, in sidelink communication (e.g., V2X communication), terminal(s) may perform discontinuous reception (DRX) operations to save power. For example, the terminal(s) may operate in an RRC idle state or an RRC inactive state to save power. In this case, a transmitting terminal may transmit a paging message to receiving terminal(s) operating in an RRC idle state or an RRC inactive state for an RRC reconfiguration operation (e.g., RRC request, RRC connection resumption), an operation of updating system information, and/or a notification operation for public safety (e.g., public warning system (PWS), earthquake and tsunami warning system (ETWS, etc.).

In exemplary embodiments, transmission of a paging message may include transmission from a base station to a transmitting terminal, transmission from a transmitting terminal to receiving terminal(s), and transmission from a base station to receiving terminal(s). In unicast-based sidelink communication, a paging message may be transmitted to one receiving terminal. In multicast, groupcast, or broadcast-based sidelink communication, a paging message may be transmitted to one or more receiving terminals. Here, the transmitting terminal may be a terminal transmitting sidelink (SL) data in sidelink communication, and the receiving terminal may be a terminal receiving the SL data in sidelink communication.

FIG. 7 is a sequence chart illustrating a first exemplary embodiment of a paging method for sidelink communication.

As shown in FIG. 7, a communication system may include a base station, a transmitting terminal, and receiving terminal(s). The base station may be the base station 210 shown in FIG. 2, the transmitting terminal may be the UE 235 shown in FIG. 2, and the receiving terminal(s) may be the UE 236 shown in FIG. 2. Each of the base station, transmitting terminal, and receiving terminal(s) may be configured identically or similarly to the communication node 300 shown in FIG. 3. The transmitting terminal and receiving terminal(s) may support the protocol stack(s) shown in FIGS. 4 to 6.

The base station may generate SL paging configuration information. The SL paging configuration information may include configuration information of sidelink paging occasion(s) (SPO(s)) and/or a sidelink-paging-radio network temporary identifier (SL-P-RNTI). The SPO(s) may be resource(s) capable of transmitting a paging DCI, a paging SCI, and/or an SL paging message. The configuration information of SPO(s) may indicate a resource pool, resources within a resource pool, or resources outside a resource pool. The SPO(s) may be indicated by a bitmap (e.g., SPO bitmap). In addition, the base station may transmit configuration information of a resource pool. The transmission operation of the configuration information of the resource pool may be performed before step S710 or in step S710. The resource pool may be indicated by a bitmap (e.g., resource bitmap). In this case, the SPO(s) may be indicated by a combination of the resource bitmap and the SPO bitmap.

A paging DCI may refer to a DCI (e.g., DCI format 3_0, DCI format 3_x) including paging information. Here, x may be a natural number. A cyclic redundancy check (CRC) of the paging DCI may be scrambled by an SL-P-RNTI. A paging SCI may refer to an SCI (e.g., SCI format 1, SCI format 2) including paging information. A CRC of the paging SCI may be scrambled by an SL-P-RNTI.

The paging information included in each of the paging DCI and the paging SCI may include a short message indicator, short message(s), frequency domain resource assignment information, time domain resource assignment information, virtual resource block (VRB)-to-physical resource block (PRB) mapping information, MCS information, transport block (TB) scaling information, ID of the transmitting terminal, group ID, broadcast ID, and/or cast type information. The cast type information may indicate unicast, multicast, groupcast, or broadcast. For example, the cast type information may indicate that an SL paging message associated with each of the paging DCI and the paging SCI is an SL paging message for unicast transmission, multicast transmission, groupcast transmission, or broadcast transmission.

The SL-P-RNTI may be used for transmission of the paging DCI or the paging SCI. The SL-P-RNTI may be configured for each cast type. For example, an SL-P-RNTI for unicast transmission, an SL-P-RNTI for multicast transmission, an SL-P-RNTI for groupcast transmission, and an SL-P-RNTI for broadcast transmission may be configured.

The base station may transmit the SL paging configuration information to the terminal(s) (e.g., transmitting terminal and receiving terminal(s)) (S710). The SL paging configuration information may be transmitted through one or a combination of two or more of higher layer signaling (e.g., system information, RRC message), MAC signaling, and PHY signaling. Each of the transmitting terminal and the receiving terminal(s) may receive the SL paging configuration information from the base station, and identify information elements (e.g., SPO configuration information, SL-P-RNTI) included in the SL paging configuration information.

The SL paging operation may be performed based on Method 1, Method 2, or Method 3.

Method 1

When paging of terminal(s) is required, the base station may transmit a paging DCI to the terminal(s) (e.g., transmitting terminal and/or receiving terminal(s)) (S720). Here, the terminal(s) may operate in an RRC idle state or an RRC inactive state. The paging DCI may be transmitted in an SPO indicated by the SL paging configuration information. The paging DCI may be transmitted only to the transmitting terminal. Alternatively, the paging DCI may be transmitted to the transmitting terminal and the receiving terminal(s). The transmitting terminal and/or the receiving terminal(s) may receive the paging DCI by performing a monitoring operation on the SPO indicated by the SL paging configuration information. The reception operation of the paging DCI may be performed using an SL-P-RNTI. The transmitting terminal and/or the receiving terminal(s) may identify information element(s) included in the paging DCI.

The transmitting terminal may transmit an SL paging message to the receiving terminal(s) (S721). The SL paging message may be transmitted using a resource indicated by the paging DCI. The resource indicated by the paging DCI may belong to an SPO configured by the SL paging configuration information. The receiving terminal(s) may receive the SL paging message from the transmitting terminal. When the SL paging message is received at the receiving terminal(s), sidelink communication between the transmitting terminal and the receiving terminal(s) may be performed. Here, the sidelink communication may be unicast, multicast, groupcast, or broadcast-based sidelink communication.

Method 2

When paging of terminal(s) is required, the base station may transmit a paging DCI to the terminal(s) (e.g., transmitting terminal and/or receiving terminal(s)) (S730). Here, the terminal(s) may operate in an RRC idle state or an RRC inactive state. The paging DCI may be transmitted in an SPO indicated by the SL paging configuration information. The transmitting terminal and/or the receiving terminal(s) may receive the paging DCI by performing a monitoring operation on the SPO indicated by the SL paging configuration information. The reception operation of the paging DCI may be performed using an SL-P-RNTI. The transmitting terminal and/or the receiving terminal(s) may identify information element(s) included in the paging DCI.

The base station may transmit an SL paging message to the transmitting terminal and/or the receiving terminal(s) (S731). The SL paging message may be transmitted using a resource indicated by the paging DCI. The resource indicated by the paging DCI may belong to an SPO configured by the SL paging configuration information. The transmitting terminal and/or the receiving terminal(s) may receive the SL paging message from the base station. When the SL paging message is received at the transmitting terminal and/or receiving terminal(s), sidelink communication between the transmitting terminal and the receiving terminal(s) may be performed. Here, the sidelink communication may be unicast, multicast, groupcast, or broadcast-based sidelink communication.

Method 3

When paging of receiving terminal(s) is required, the transmitting terminal may transmit a paging SCI to the receiving terminal(s) (S740). Here, the receiving terminal(s) may operate in an RRC idle state or an RRC inactive state. The paging SCI may be transmitted in an SPO indicated by the SL paging configuration information. The receiving terminal(s) may receive the paging SCI by performing a monitoring operation on the SPO indicated by the SL paging configuration information. The reception operation of the paging SCI may be performed using an SL-P-RNTI. The receiving terminal(s) may identify information element(s) included in the paging SCI.

The transmitting terminal may transmit an SL paging message to the receiving terminal(s) (S741). The SL paging message may be transmitted using a resource indicated by the paging SCI. The resource indicated by the paging SCI may belong to an SPO configured by the SL paging configuration information. The paging SCI and the SL paging message associated with the paging SCI may be transmitted in the same SPO (e.g., the same slot). The transmitting terminal and/or the receiving terminal(s) may receive the SL paging message from the base station. When the SL paging message is received at the receiving terminal(s), sidelink communication between the transmitting terminal and the receiving terminal(s) may be performed. Here, the sidelink communication may be unicast, multicast, groupcast, or broadcast-based sidelink communication.

Hereinafter, methods for configuring SPO(s) will be described. Information element(s) for configuring SPO(s) may be transmitted in step S710. The SPO may be referred to as a 'paging transmission period' or a 'paging transmission region'.

[Resource Pool-Based SPO Configuration Method]

In sidelink communication, resource pool(s) may be configured (or, preconfigured) based on a bitmap. The resource pool(s) may be configured with a specific periodicity. A unit of the resource pool configured by one bitmap may be a plurality of slots. Here, the number of the plurality of slots (i.e., unit of the resource pool) may be the number of slots included in one radio frame. Alternatively, the unit of the resource pool may be less than or more than the number of slots included in one radio frame. The number of slots included in the radio frame may vary according to a system parameter (e.g., subcarrier spacing, etc.).

In exemplary embodiments, one bitmap may be used to configure the resource pools for each of 10 slots. In this case, the size of the bitmap may be 10 bits, and each bit may indicate whether one slot is configured as the resource pool. An application periodicity of the bitmap may be preset. When the application periodicity of the bitmap is two radio frames, the bitmap may be applied to radio frames #n, #n+2, #n+4, #n+6, and the like. n may be an integer greater than or equal to 0.

The resource pool may be classified into a Tx resource pool and an Rx resource pool. The Tx resource pool may be a resource pool used for sidelink transmission, and the Rx resource pool may be a resource pool used for sidelink reception. The Tx resource pool and the Rx resource pool may be identically configured. When the configuration of the Tx resource pool is different from that of the Rx resource pool, the resource pool may be interpreted as a Tx resource pool, an Rx resource pool, or an exceptional resource pool according to a transmission or reception entity of an SL paging message.

When an SL paging message is transmitted from the base station to the transmitting terminal, the resource pool (e.g., the resource pool and/or SPO through which the SL paging message is transmitted) may be a Tx resource pool or an Rx resource pool configured in the transmitting terminal. When an SL paging message is transmitted from the transmitting terminal to the receiving terminal(s), the resource pool (e.g., the resource pool and/or SPO through which the SL paging message is transmitted) may be an Rx resource pool configured in the receiving terminal(s). When an SL paging message is transmitted from the base station to the receiving terminal(s), the resource pool (e.g., the resource pool and/or SPO through which the SL paging message is transmitted) may be an Rx resource pool configured in the receiving terminal(s). When the Tx/Rx resource pools of the transmitting terminal and the receiving terminal(s) are configured identically, the resource pool (e.g., SPO) through which the SL paging message is transmitted may be an exceptional resource pool.

1. Method of Configuring a Specific Resource Region within a Resource Pool as SPO(s)

FIG. 8 is a conceptual diagram illustrating a first exemplary embodiment of an SPO configuration method in a communication system.

As shown in FIG. 8, a bitmap may indicate whether a resource pool is configured in each of 10 slots. The bitmap used for configuring a resource pool may be referred to as a 'resource bitmap'. 10 slots configured by the resource bitmap may be contiguous slots or non-contiguous slots. The non-contiguous slots may be slots excluding slot(s) reserved for transmission of signals and/or channels among contiguous slots. A bit set to a first value (e.g., 0) in the resource bitmap may indicate that the resource pool is not configured in a slot(s) mapped to the bit (e.g., the slot(s) does not belong to the resource pool) and, a bit set to a second value (e.g., 1) in the resource bitmap may indicate that the resource pool is configured in a slot(s) mapped to the bit (e.g., the slot(s) belongs to the resource pool). Each bit included in the resource bitmap may be mapped to one slot or a plurality of slots. The resource bitmap may be applied based on a preset periodicity. When the preset periodicity is two radio frames, the resource bitmap may be applied to every two radio frames. The preset periodicity for the resource bitmap may be indicated by one or a combination of two or more of higher layer signaling, MAC signaling, and PHY signaling.

The resource bitmap may be set to [1 0 0 1 1 1 0 0 1 1], and may be applied to radio frames #1, #3, #5, #7, and the like. That is, since the same resource bitmap is applied to every two radio frames, the resource pool may be identically configured for every two radio frames. The SPO slot may be a slot capable of transmitting a paging DCI, a paging SCI, and/or an SL paging message. A configuration periodicity of the SPO (e.g., SPO slot) may be the same as a configuration periodicity of the resource pool.

FIG. 9 is a conceptual diagram illustrating a first exemplary embodiment of an SPO indication method in a communication system.

As shown in FIG. 9, a bitmap may indicate whether an SPO is configured in each of slots. The bitmap used for configuring SPO(s) may be referred to as an 'SPO bitmap'. The SPO bitmap may be configured based on Scheme 1 or Scheme 2. When Scheme 1 is used, the number of bits included in the SPO bitmap may be the same as the number of bits included in the resource bitmap. That is, a configuration unit of the SPO bitmap may be the same as a configuration unit of the resource bitmap. In this case, the SPO bitmap may indicate whether an SPO is configured in each of all slots (e.g., 10 slots) associated with the resource bitmap. According to Scheme 1, the SPO bitmap may be set to [0 0 0 0 0 0 0 0 1 1].

When Scheme 2 is used, the SPO bitmap may indicate whether an SPO is configured in each of slots (e.g., 6 slots) in which the resource pool is configured among all slots (e.g., 10 slots) associated with the resource bitmap. The slots in which the resource pool is configured may be indicated by the resource bitmap. According to Scheme 2, the SPO bitmap may be set to [0 0 0 0 1 1]. A bit set to a first value (e.g., 0) in the SPO bitmap may indicate that SPO(s) is not configured in a slot(s) mapped to the bit, and a bit set to a second value (e.g., 1) in the SPO bitmap may indicate that SPO(s) is configured in a slot(s) mapped to the bit. Each bit included in the SPO bitmap may be mapped to one slot or a plurality of slots.

A configuration periodicity of the SPO may be the same as a configuration periodicity of the resource pool. Alternatively, the configuration periodicity of the SPO may be different from the configuration periodicity of the resource pool. The configuration periodicity of the SPO may be indicated by one or a combination of two or more of higher layer signaling, MAC signaling, and PHY signaling. The SPO(s) may be configured by a function instead of the SPO bitmap. Variables in the function for configuring the SPO(s) may include a system frame index, radio frame index, resource pool configuration information (e.g., resource bitmap), identifier (e.g., ID) of the receiving terminal, ID of the transmitting terminal, group ID, cell ID, transmission periodicity of the SL paging message (e.g., configuration periodicity of the SPO), and/or new variable(s) configured by higher layer signaling.

A radio frame capable of transmitting paging control information (e.g., DCI, SCI) and/or SL paging message may be indicated by the function based on various variables, and a slot capable of transmitting the paging control information and/or SL page message within the radio frame may be indicated by the SPO bitmap. Alternatively, all radio frames and slots capable of transmitting paging control information and/or SL paging message may be indicated by a function. Alternatively, a radio frame capable of transmitting paging control information and/or SL paging message may be indicated by a bitmap, and a slot capable of transmitting the paging control information and/or SL paging message within the radio frame may be indicated by a function.

FIG. 10 is a conceptual diagram illustrating a second exemplary embodiment of an SPO configuration method in a communication system.

As shown in FIG. 10, a configuration periodicity of SPO(s) (e.g., SPO slot(s)) may be different from a configuration periodicity of a resource pool. The SPO may be configured every 4 radio frames, and the resource pool may be configured every 2 radio frames. The periodicity of the SPO may be set in units of radio frames or n slots. Here, n may be a natural number. A bitmap (e.g., resource bitmap and/or SPO bitmap) may be set in units of n slots. A unit of the n slots may be configured to be the same as a configuration unit of the resource pool. Alternatively, the unit of the n slots may be configured differently from the configuration unit of the resource pool.

FIG. 11 is a conceptual diagram illustrating a third exemplary embodiment of an SPO configuration method in a communication system.

As shown in FIG. 11, SPOs (e.g., SPO slots) may be configured non-contiguously. That is, SPOs may be distributed in slots. The receiving terminal(s) may periodically wake up to obtain an SL paging message and attempt to decode the SL paging message. To support this operation, the receiving terminal(s) may periodically obtain a synchronization signal, and may maintain synchronization based on the synchronization signal. Therefore, the SPO slots may be configured in consideration of a transmission periodicity of the synchronization signal. For example, a slot after a transmission period in which the synchronization signal is transmitted (e.g., a slot in which the synchronization signal is transmitted) may be configured as the SPO slot. The SPO (e.g., SPO slot) may be relatively configured based on the transmission period of the synchronization signal in the resource pool.

When Scheme 1 is used in the exemplary embodiments shown in FIGS. 10 and 11, the SPO bitmap may include 10 bits. That is, the size of the SPO bitmap may be the same as the size of the resource bitmap. When Scheme 2 is used in the exemplary embodiments shown in FIGS. 10 and 11, the SPO bitmap may include 6 bits. That is, the SPO bitmap may indicate whether an SPO is configured in each of 6 slots configured as the resource pool by the resource bitmap. A configuration periodicity of the SPO may be the same as a configuration periodicity of the resource pool. Alternatively, the configuration periodicity of the SPO may be configured differently from the configuration periodicity of the resource pool.

Periodicity information (e.g., SPO and/or resource pool configuration periodicity information) may be transmitted using one or a combination of two or more of higher layer signaling, MAC signaling, and PHY signaling. The SPO(s) may be configured by a function instead of the SPO bitmap. Alternatively, the SPO(s) may be configured as m slot(s) from the k-th slot or slot(s) from the k-th slot to the p-th slot, based on a resource (e.g., slot) reserved for sidelink-synchronization signal block (S-SSB) transmission. Information (e.g., k, m, and/or p) indicating the slot(s) in which the SPO(s) is configured may be transmitted using one or a combination of two or more of higher layer signaling, MAC signaling, and PHY signaling. Here, each of k, m, and p may be a natural number.

A reference of the resource reserved for S-SSB transmission may be the first slot or the last slot among slot(s) in which the S-SSB is transmitted. Alternatively, the reference of resource reserved for S-SSB transmission may be the first slot or the last slot among slot(s) in which a sidelink-primary synchronization signal (e.g., PSSS), a sidelink-secondary synchronization signal (e.g., SSSS), or a PSBCH constituting the S-SSB is transmitted. The reference of the resource reserved for S-SSB transmission may be interpreted as follows.

The SPO may be configured based on an absolute resource position of the slot(s) in which the S-SSB is transmitted. In this case, the SPO may be indicated based on an absolute position of a physical resource, not a relative reference for the slot configured as the resource pool.

The SPO may be configured according to a slot belonging to the resource pool based on a position of the resource in which the S-SSB is transmitted. In this case, after the S-SSB is transmitted, the SPO may be configured based on the slot(s) belonging to the resource pool. For example, when slot(s) belonging to a resource pool exists from the fourth slot after transmission of the S-SSB, the first slot after a transmission resource of the S-SSB may refer to the first slot within the resource pool after a transmission time of the S-SSB, and the first slot after the transmission resource of the S-SSB may be the fourth slot after the transmission of the S-SSB based on the absolute position of the resource.

The SPO may be configured based on a function. Variables in the function for configuring SPO(s) may be a system frame index, radio frame index, resource pool configuration information (e.g., resource bitmap), identifier (e.g., ID) of the receiving terminal, identifier of the transmitting terminal, group ID, cell ID, transmission periodicity of the SL paging message (e.g., SPO configuration periodicity), variable(s) related to transmission resource configuration of synchronization signals, and/or new variable(s) configured by higher layer signaling.

A radio frame capable of transmitting paging control information (e.g., DCI, SCI) and/or SL paging message may be indicated by a function based on various variables, and a slot capable of transmitting the paging control information and/or SL paging message within the radio frame may be indicated by the SPO bitmap. Alternatively, all radio frames and slots capable of transmitting paging control information and/or SL paging message may be indicated by a function. Alternatively, a radio frame capable of transmitting paging control information and/or SL paging message may be indicated by a bitmap, and a slot capable of transmitting the paging control information and/or SL paging message within the radio frame may be indicated by a function.

2. Method of Configuring a Specific Resource Region Outside a Resource Pool as SPO(s)

FIG. 12 is a conceptual diagram illustrating a fourth exemplary embodiment of an SPO configuration method in a communication system.

As shown in FIG. 12, SPO(s) may be configured in slot(s) that do not belong to a resource pool. A resource bitmap may indicate whether a resource pool is configured in each of 10 slots. The 10 slots configured by the resource bitmap may be contiguous slots or non-contiguous slots. The non-contiguous slots may be slots excluding slot(s) reserved for transmission of signals and/or channels among the contiguous slots. A bit set to a first value (e.g., 0) in the resource bitmap may indicate that the resource pool is not configured in a slot(s) mapped to the bit (e.g., the slot(s) does not belong to the resource pool) and, a bit set to the second value (e.g., 1) in the resource bitmap may indicate that the resource pool is configured in a slot(s) mapped to the bit (e.g., the slot(s) belongs to the resource pool). Each bit included in the resource bitmap may be mapped to one slot or a plurality of slots. The resource bitmap may be applied based on a preset periodicity. When the preset periodicity is two radio frames, the resource bitmap may be applied to every two radio frames. The preset periodicity for the resource bitmap may be indicated by one or a combination of two or more of higher layer signaling, MAC signaling, and PHY signaling.

The resource bitmap may be set to [1 0 0 1 1 1 0 0 1 1], and may be applied to radio frames #1, #3, #5, #7, and the like. That is, since the same resource bitmap may be applied to every two radio frames, the resource pool may be identically configured for every two radio frames. An SPO slot may be a slot capable of transmitting a paging DCI, a paging SCI, and/or an SL paging message. The SPO (e.g., SPO slot) may be configured among slots that are not configured as the resource pool. A configuration periodicity of the SPO (e.g., SPO slot) may be the same as the configuration periodicity of the resource pool.

FIG. 13 is a conceptual diagram illustrating a second exemplary embodiment of an SPO indication method in a communication system.

As shown in FIG. 13, an SPO bitmap may indicate whether an SPO is configured in each of slots. The SPO bitmap may be configured based on Scheme 1 or Scheme 2. When Scheme 1 is used, the number of bits included in the SPO bitmap may be the same as the number of bits included in the resource bitmap. That is, a configuration unit of the SPO bitmap may be the same as a configuration unit of the resource bitmap. In this case, the SPO bitmap may indicate whether an SPO is configured in each of all slots (e.g., 10 slots) associated with the resource bitmap. According to Scheme 1, the SPO bitmap may be set to [0 0 0 0 0 0 1 1 0 0].

When Scheme 2 is used, whether an SPO is configured in each of slots (e.g., 4 slots) in which the resource pool is not configured among all slots (e.g., 10 slots) associated with the resource bitmap may be indicated. The slots in which the resource pool is not configured may be indicated by the resource bitmap. According to Scheme 2, the SPO bitmap may be set to [0 0 1 1]. A bit set to a first value (e.g., 0) in the SPO bitmap may indicate that SPO(s) is not configured in a slot(s) mapped to the bit, and a bit set to a second value (e.g., 1) in the SPO bitmap may indicate that SPO(s) is configured in a slot(s) mapped to the bit. Each bit included in the SPO bitmap may be mapped to one slot or a plurality of slots.

A configuration periodicity of the SPO may be the same as a configuration periodicity of the resource pool. Alternatively, the configuration periodicity of the SPO may be different from the configuration periodicity of the resource pool. The configuration periodicity of the SPO may be indicated by one or a combination of two or more of higher layer signaling, MAC signaling, and PHY signaling. The SPO may be configured by a function instead of the SPO bitmap. Variables in the function for configuring SPO(s) may be a system frame index, radio frame index, resource pool configuration information (e.g., resource bitmap), identifier of the receiving terminal, identifier of the transmitting terminal, group ID, cell ID, transmission periodicity of the SL paging message (e.g., configuration periodicity of SPO), and/or new variable(s) configured by higher layer signaling.

A radio frame capable of transmitting paging control information (e.g., DCI, SCI) and/or SL paging message may be indicated by a function based on various variables, and a slot capable of transmitting the paging control information and/or SL paging message within the radio frame may be indicated by the SPO bitmap. Alternatively, all radio frames and slots capable of transmitting paging control information and/or SL paging message may be indicated by a function. Alternatively, a radio frame capable of transmitting paging control information and/or SL paging message may be indicated by a bitmap, and a slot capable of transmitting the paging control information and/or SL paging message within the radio frame may be indicated by a function.

FIG. 14 is a conceptual diagram illustrating a fifth exemplary embodiment of an SPO configuration method in a communication system.

As shown in FIG. 14, a configuration periodicity of SPO(s) (e.g., SPO slot(s)) may be different from a configuration periodicity of a resource pool. The SPO may be configured every 4 radio frames, and the resource pool may be configured every 2 radio frames. A periodicity of the SPO may be set in units of radio frames or n slots. Here, n may be a natural number. A bitmap (e.g., resource bitmap and/or SPO bitmap) may be configured in units of n slots. The unit of the n slots may be configured to be the same as a configuration unit of the resource pool. Alternatively, the unit of the n slots may be configured differently from the configuration unit of the resource pool.

FIG. 15 is a conceptual diagram illustrating a sixth exemplary embodiment of an SPO configuration method in a communication system.

As shown in FIG. 15, SPOs (e.g., SPO slots) may be configured non-contiguously. That is, the SPOs may be distributed in slots. The receiving terminal(s) may periodically wake up to obtain an SL paging message and attempt to decode the SL paging message. To support this operation, the receiving terminal(s) may periodically obtain a synchronization signal, and may maintain synchronization based on the synchronization signal. Therefore, the SPO slots may be configured in consideration of a transmission periodicity of the synchronization signal. For example, a slot after a transmission period of the synchronization signal may be configured as the SPO slot. The SPO (e.g., SPO slot) may be configured relatively based on the transmission period of the synchronization signal within the resource pool.

When Scheme 1 is used in the exemplary embodiments shown in FIGS. 14 and 15, the SPO bitmap may include 10 bits. That is, the size of the SPO bitmap may be the same as the size of the resource bitmap. When Scheme 2 is used in the exemplary embodiments shown in FIGS. 14 and 15, the SPO bitmap may include 4 bits. That is, the SPO bitmap may indicate whether an SPO is configured in each of four slots that are not configured as the resource pool by the resource bitmap. The configuration periodicity of the SPO may be the same as the configuration periodicity of the resource pool. Alternatively, the configuration periodicity of the SPO may be set differently from the configuration periodicity of the resource pool.

Periodicity information (e.g., SPO and/or resource pool configuration periodicity information) may be transmitted using one or a combination of two or more of higher layer signaling, MAC signaling, and PHY signaling. The SPO may be configured by a function instead of the SPO bitmap. Alternatively, the SPO may be configured in m slot(s) from k-th slot or slots from the k-th slot to the p-th slot based on a transmission region of synchronization signals (e.g., S-SSB). Information (e.g., k, m, and/or p) indicating the slot(s) in which the SPO is configured may be transmitted using one or a combination of two or more of higher layer signaling, MAC signaling, and PHY signaling. Here, each of k, m, and p may be a natural number.

The SPO may be configured based on a function. Variables in the function for configuring the SPO(s) may be a system frame index, radio frame index, resource pool configuration information (e.g., resource bitmap), ID of the receiving terminal, ID of the transmitting terminal, group ID, cell ID, transmission periodicity of the SL paging message (e.g., configuration periodicity of the SPO), variable(s) related to transmission resource configuration of synchronization signals, and/or new variable(s) configured by higher layer signaling.

A radio frame capable of transmitting paging control information and/or SL paging message may be indicated by a function based on various variables, and a slot capable of transmitting the paging control information and/or SL paging message within the corresponding radio frame may be indicated by the SPO bitmap. Alternatively, all radio frames and slots capable of transmitting the paging control information and/or SL paging message may be indicated by a function. Alternatively, a radio frame capable of transmitting paging control information and/or SL paging message may be indicated by a bitmap, and a slot capable of transmitting the paging control information and/or SL paging message within the radio frame may be determined by a function.

FIG. 16 is a conceptual diagram illustrating a seventh exemplary embodiment of an SPO configuration method in a communication system.

As shown in FIG. 16, SPO(s) may be configured in slot(s) within a radio frame in which a resource pool is not configured. Here, a resource bitmap for each of radio frames #2 and #6 may be set to [0 0 0 0 0 0 0 0 0 0]. An SL paging message may be transmitted for public safety. The SPO(s) may be configured in any resource(s) outside the resource pool, and may be used for specific purposes. In this case, for configuration of the radio frames in which the SPO(s) is configured, periodicity information of the radio frames in which the SPO(s) is configured may be transmitted by one or a combination of two or more of higher layer signaling, MAC signaling, and PHY signaling. Alternatively, the periodicity of the radio frame(s) in which the SPO(s) are configured may be indicated by a function.

An SPO slot within a radio frame may be indicated by an SPO bitmap or a function. In this case, variables in the function for configuring SPO(s) (e.g., SPO slot(s)) may be a system frame index, radio frame index, resource pool configuration information (e.g., resource bitmap), ID of the receiving terminal, ID of the transmitting terminal, group ID, cell ID, transmission periodicity of the SL paging message (e.g., configuration periodicity of the SPO), variable(s) related to transmission resource configuration of synchronization signals, and/or new variable(s) configured by higher layer signaling.

The SPO(s) may be configured only within the resource pool. Alternatively, the SPO(s) may be configured only in resources outside the resource pool. The resources outside the resource pool may be slot(s) not configured as the resource pool within the radio frame to which the resource pool belongs and radio frames in which resource pools are not configured. Combinations of the exemplary embodiments shown in FIGS. 8 to 16 may be used. Alternatively, the exemplary embodiment(s) expanded and/or modified from the exemplary embodiments shown in FIGS. 8 to 16 may be used.

3. Method of Configuring SPO(s) in Resource Pools Used in Adjacent Regions

FIG. 17 is a conceptual diagram illustrating an eighth exemplary embodiment of an SPO configuration method in a communication system.

As shown in FIG. 17, common SPO(s) may be configured in resource pools allocated to adjacent regions (e.g., region #1, region #2, region #3). The region may mean a zone. The same resources (e.g., the same slots) in the resource pools allocated to the adjacent regions may be configured as SPO(s). The same slots may be common slots for which the resource pools are configured. In order to efficiently perform an SL paging operation in a specific situation, the same resources may be configured as SPO(s). The specific situation may be when a broadcast or groupcast-based SL paging operation is performed, when interference management (e.g., interference cancellation) between SL paging messages is required, and/or the like.

In each of the regions, one resource region (e.g., radio frame) may include 10 slots, and a resource bitmap may include 10 bits to indicate whether a resource pool is configured in each of 10 slots belonging to one resource region. Alternatively, the number of bits included in the resource bitmap is not limited to 10, and may be set variously. The resource pool may be repeatedly configured at a specific periodicity based on the resource bitmap. The resource bitmap for the region #1 may be set to [1 0 1 1 0 0 1 1 0 0], the resource bitmap for the region #2 may be set to [0 0 1 0 0 1 1 0 1 1], and the resource bitmap for the region #3 may be set to [0 1 1 1 1 0 1 0 0 0].

FIG. 18 is a conceptual diagram illustrating a third exemplary embodiment of an SPO indication method in a communication system.

As shown in FIG. 18, an SPO bitmap may indicate whether an SPO is configured in each of slots. The SPO bitmap may be configured based on Scheme 1 or Scheme 2. When Scheme 1 is used, the number of bits included in the SPO bitmap may be the same as the number of bits included in the resource bitmap. That is, a configuration unit of the SPO bitmap may be the same as a configuration unit of the resource bitmap. In this case, the SPO bitmap may indicate whether SPO(s) is configured in each of all slots (e.g., 10 slots) associated with the resource bitmap. According to Scheme 1, the SPO bitmap may be set to [0 0 1 0 0 0 1 0 0 0].

Alternatively, the SPO (e.g., SPO slot) may be indicated based on slot(s) in which the resource pool is configured for each region. When Scheme 2 is used, whether the SPO is configured in each of slots (e.g., 5 slots) in which the resource pool is configured among all slots (e.g., 10 slots) associated with the resource bitmap. The slots in which the resource pool is configured may be indicated by the resource bitmap. According to Scheme 2, the SPO bitmap for the region #1 may be set to [0 1 0 1 0], the SPO bitmap for the region #2 may be set to [1 0 1 0 0], and the SPO bitmap for the region #3 may be set to [0 1 0 0 1]. A bit set to a first value (e.g., 0) in the SPO bitmap may indicate that SPO(s) is not configured in a slot(s) mapped to the bit, and a bit set to a second value (e.g., 1) in the SPO bitmap may indicate that SPO(s) is configured in a slot(s) mapped to the bit.

When Scheme 2 is used, since slots for which the resource pool is configured are different for each region, even when the same slot(s) is configured as the SPO slot(s) in the regions, the SPO bitmap may be set differently for each region.

FIG. 19 is a conceptual diagram illustrating a ninth exemplary embodiment of an SPO configuration method in a communication system.

As shown in FIG. 19, common SPO(s) may be configured in the same resources (e.g., the same slots) that are not configured as resource pools in adjacent regions (e.g., region #1, region #2, region #3). The same slots may be shared slots for which the resource pool(s) is not configured.

FIG. 20 is a conceptual diagram illustrating a fourth exemplary embodiment of an SPO indication method in a communication system.

As shown in FIG. 20, an SPO bitmap may indicate whether an SPO is configured in each of slots. The SPO bitmap may be configured based on Scheme 1 or Scheme 2. When Scheme 1 is used, the number of bits included in the SPO bitmap may be the same as the number of bits included in a resource bitmap. In this case, the SPO bitmap may indicate whether the SPO is configured in each of all slots (e.g., 10 slots) associated with the resource bitmap. According to Scheme 1, the SPO bitmap may be set to [0 0 1 0 0 0 1 0 0 0].

When Scheme 2 is used, whether the SPO is configured in each of slots (e.g., 7 slots) in which the resource pool is not configured among all slots (e.g., 10 slots) associated with the resource bitmap. The slots in which the resource pool is not configured may be indicated by the resource bitmap. According to Scheme 2, the SPO bitmap for the region #1 may be set to [0 1 0 0 1 0 0], the SPO bitmap for the region #2 may be set to [0 0 1 0 0 1 0], and the SPO bitmap for the region #3 may be set to [0 1 0 1 0 0 0].

The SPO(s) (e.g., SPO slot(s)) may be indicated by a function instead of the SPO bitmap. In this case, variables in the function for configuring the SPO(s) may be a system frame index, radio frame index, resource pool configuration information (e.g., resource bitmap), ID of the receiving terminal, ID of the transmitting terminal, group ID, cell ID, transmission periodicity of the SL paging message (e.g., configuration periodicity of the SPO), variable(s) related to transmission resource configuration of synchronization signals, and/or new variable(s) configured by higher layer signaling.

The periodicity of the resource region composed of a radio frame or n slots may be indicated by one or a combination of two or more of higher layer signaling, MAC signaling, and PHY signaling. Alternatively, the periodicity of the resource region composed of a radio frame or n slots may be indicated by a function or a bitmap. Here, n may be a natural number.

4. Method of Identifying an SL Paging Message

The receiving terminal(s) may perform a monitoring operation for reception of an SL paging message in the SPO. In this case, a control and/or data channel associated with an SL paging operation may be transmitted based on an ID (e.g., SL-P-RNTI) indicating that transmission of the SL paging message is performed. When it is identified that a message received at the receiving terminal(s) is an SL paging message, the receiving terminal(s) may perform a decoding operation on the received message. The identification operation of the SL paging message may be performed based on the SL-P-RNTI.

The receiving terminal(s) may identify whether its own ID, an ID of a group to which it belongs, an ID of a cell to which it belongs, or a broadcast ID exists in the SL paging message. When the corresponding ID is present in the SL paging message, the receiving terminal(s) may perform a preconfigured operation. The preconfigured operation may be an RRC reconfiguration operation, system information (e.g., updated system information) acquisition operation, or public safety message reception operation.

An ID (hereinafter, referred to as a 'broadcast ID') for broadcast-based sidelink communication may be preconfigured between the transmitting terminal and receiving terminal(s). When a broadcast ID is present in the SL paging message, all receiving terminals may decode the SL paging message. The broadcast ID may be associated with a specific short message for public safety. In this case, the receiving terminal(s) may recognize broadcast information (e.g., specific short message for public safety) based on the broadcast ID.

A plurality of IDs may be preconfigured for transmission of a plurality of short messages. The short messages may be used for transmission of information required in V2X communication in addition to transmission of public safety information. The above-described operations may be applied to groupcast communication and/or unicast communication as well as broadcast communication.

In groupcast communication (e.g., groupcast-based sidelink communication), an SL paging operation for a plurality of receiving terminals may be performed based on an ID (e.g., group ID) commonly used by a group. When the group ID is present in the SL paging message, receiving terminals belonging to the group may decode the SL paging message based on the group ID, and perform a preconfigured operation based on information element(s) included in the SL paging message. The preconfigured operation may be an RRC reconfiguration operation, system information (e.g., updated system information) acquisition operation, or public safety message reception operation. The group ID may be an ID of the transmitting terminal. Alternatively, the group ID may be an ID representing a group preconfigured between the transmitting terminal and the receiving terminal(s).

In unicast communication (e.g., unicast-based sidelink communication), an SL paging operation for a specific receiving terminal may be performed based on the ID of the transmitting terminal and/or the ID of the receiving terminal. When the ID of the transmitting terminal and/or the ID of the receiving terminal is present in the SL paging message, the receiving terminal may decode the SL paging message based on the ID of the transmitting terminal and/or the ID of the receiving terminal, and may perform a preconfigured operation based on information element(s) included in the SL paging message.

In V2X communication, the SL paging operation may be indicated by a scrambling sequence (e.g., a specific ID or SL-P-RNTI related to the SL paging message), CRC masking, or the like for a first-stage SCI. The receiving terminal(s) may identify that the SL paging message is transmitted by receiving the first-stage SCI. An ID indicating a target of SL paging in each of unicast communication, groupcast communication, and broadcast communication may be included in a second-stage SCI. Alternatively, the ID indicating the target of SL paging in each of unicast communication, groupcast communication, and broadcast communication may be transmitted through a data region of a PSSCH corresponding to the SCI (e.g., PSSCH scheduled by the SCI). Alternatively, a part of the ID indicating the target of SL paging in each of unicast communication, groupcast communication, and broadcast communication may be included in the second-stage SCI, and the remainder of the ID may be included in a data region of the PSSCH.

When the SL paging message is transmitted from the base station to the receiving terminal(s), a DCI or SCI associated with the SL paging message may include the ID of the transmitting terminal so that the receiving terminal(s) identifies the transmitting terminal associated with the SL paging message. The DCI or SCI associated with the SL paging message in unicast communication may further include the ID of the transmitting terminal. The DCI or SCI associated with the SL paging message in groupcast communication may further include a group ID. The ID for identification of the transmitting terminal may be the same as the ID for indicating the SL paging target. Alternatively, the ID for identification of the transmitting terminal may be partially the same as the ID for indicating the SL paging target.

[Resource Pool-Independent SPO Configuration Method]

SPO(s) may be configured independently of a resource pool. For example, the base station may configure SPO(s) (e.g., sidelink resource(s) for transmission and reception of paging control information and/or SL paging message) to the terminal(s) (e.g., transmitting terminal and/or receiving terminal(s)). The SPO(s) may be configured in a plurality of slots. The plurality of slots configured for the SPO(s) may have a specific periodicity. That is, the SPO(s) may be repeatedly configured. In this case, the SPO(s) may overlap (e.g., partially overlap) resource pool(s) of the transmitting terminal and/or the receiving terminal(s). The SPO(s) may be configured by a bitmap similarly to the configuration method of the resource pool. The SPO(s) configured by the bitmap may be repeated according to a preset periodicity. One bit included in the bitmap may be mapped to one slot or a plurality of slots. A slot mapped to each bit included in the bitmap may be a slot at a specific time point in each of radio frames.

For example, a bitmap having a size of 5 bits may be set to [0 0 0 0 1]. In the bitmap, the first bit may be mapped to a radio frame #n, the second bit may be mapped to a radio frame #n+1, the third bit may be mapped to a radio frame #n+2, the fourth bit may be mapped to a radio frame #n+3, and the fifth bit may be mapped to a radio frame #n+4. Here, n may be an integer of 0 or more. The bitmap may indicate that the SPO(s) is configured in slots from the x-th slot to the y-th slot or z slot(s) from the x-th slot in the radio frame #n+4. Here, x, y, and/or z may be indicated by one or a combination of two or more of higher layer signaling, MAC signaling, and PHY signaling. Alternatively, the slot(s) in which the SPO(s) is configured in the fifth radio frame may be indicated by an additional bitmap.

When a resource region for transmission of the SL paging message is configured, the base station and/or the transmitting terminal may transmit the SL paging message in the corresponding resource region, and the receiving terminal(s) may perform a monitoring operation for reception of the SL paging message in the corresponding resource region. For identification/classification of the SL paging message in the receiving terminal(s), the above-described operations, an operation extended from the above-described operations, and/or an operation modified from the above-described operations may be performed.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

The invention claimed is:

1. An operation method of a transmitting terminal in a communication system, the operation method comprising:
    receiving, from a base station, sidelink (SL) paging configuration information;
    receiving, from the base station, paging downlink control information (DCI) in a sidelink paging occasion (SPO) indicated by the SL paging configuration information; and
    transmitting an SL paging message to one or more receiving terminals in a sidelink resource indicated by the paging DCI.

2. The operation method according to claim 1, wherein the SL paging configuration information further includes a sidelink-paging-radio network temporary identifier (SL-P-RNTI), and the paging DCI is received using the SL-P-RNTI.

3. The operation method according to claim 2, wherein the SL-P-RNTI is configured for each cast type, and the cast type is unicast, groupcast, or broadcast.

4. The operation method according to claim 1, wherein the paging DCI further includes an identifier (ID) indicating a cast type of the SL paging message, and the ID is an ID of the transmitting terminal, a group ID, or a broadcast ID.

5. The operation method according to claim 1, further comprising, when the transmission of the SL paging message is completed, performing sidelink communication with the one or more receiving terminals according to a cast type associated with the SL paging message, wherein the cast type is unicast, groupcast, or broadcast.

6. An operation method of a transmitting terminal in a communication system, the operation method comprising:
    receiving, from a base station, sidelink (SL) paging configuration information;
    transmitting, to one or more receiving terminals, paging sidelink control information (SCI) in a sidelink paging occasion (SPO) indicated by the SL paging configuration information; and
    transmitting, to the one or more receiving terminals, an SL paging message in a sidelink resource indicated by the paging SCI.

7. The operation method according to claim 6, wherein the SPO is configured within a resource pool configured by the base station, and a first bitmap indicating one or more slots in which the SPO is configured within the resource pool is included in the SL paging configuration information.

8. The operation method according to claim 7, wherein a second bitmap indicating one or more slots in which the resource pool is configured is received from the base station, and the SPO is indicated by a combination of the first bitmap and the second bitmap.

9. The operation method according to claim 7, wherein a number of bits included in the first bitmap is equal to a number of slots configured as the resource pool within a preconfigured period.

10. The operation method according to claim 7, wherein a number of bits included in the first bitmap is equal to a number of all slots belonging to a period according to a configuration unit of the resource pool.

11. The operation method according to claim 6, wherein the SPO is configured outside a resource pool configured by the base station, and a first bitmap indicating one or more slots in which the SPO is configured outside the resource pool is included in the SL paging configuration information.

12. The operation method according to claim 6, wherein the SL paging configuration information further includes a sidelink-paging-radio network temporary identifier (SL-P-RNTI), and the paging SCI is received using the SL-P-RNTI.

13. The operation method according to claim 12, wherein the SL-P-RNTI is configured for each cast type, and the cast type is unicast, groupcast, or broadcast.

14. The operation method according to claim 6, wherein the paging SCI further includes an identifier (ID) indicating a cast type of the SL paging message, and the ID is an ID of the transmitting terminal, a group ID, or a broadcast ID.

15. The operation method according to claim 6, further comprising, when the transmission of the SL paging message is completed, performing sidelink communication with the one or more receiving terminals according to a cast type associated with the SL paging message, wherein the cast type is a unicast, a groupcast, or a broadcast.

16. An operation method of a receiving terminal in a communication system, the operation method comprising:
    receiving, from a base station, sidelink (SL) paging configuration information;
    receiving, from a transmitting terminal, paging sidelink control information (SCI) by performing a monitoring operation on a sidelink paging occasion (SPO) indicated by the SL paging configuration information; and
    receiving, from the transmitting terminal, an SL paging message in a sidelink resource indicated by the paging SCI.

17. The operation method according to claim 16, wherein the paging SCI and the SL paging message associated with the paging SCI are received in a same SPO.

18. The operation method according to claim 16, wherein the SPO is configured within a resource pool configured by the base station, and a first bitmap indicating one or more slots in which the SPO is configured within the resource pool is included in the SL paging configuration information.

19. The operation method according to claim 16, wherein the SL paging configuration information further includes a sidelink-paging-radio network temporary identifier (SL-P-RNTI), and the paging SCI is received using the SL-P-RNTI.

20. The operation method according to claim 16, wherein the paging SCI further includes an identifier (ID) indicating a cast type of the SL paging message, and the ID is an ID of the transmitting terminal, a group ID, or a broadcast ID.

* * * * *